United States Patent Office 3,708,486
Patented Jan. 2, 1973

3,708,486
2 - [p - (N'-CYCLOALKYL-CARBAMIDO-N-SUL-FONYL)-PHENETHYL] - 1,2,3,4-TETRAHYDRO-1,3 - DIOXO - 4,4-DIMETHYL-ISOQUINOLINES AND ALKALI METAL SALTS THEREOF
Eberhard Kutter, Gerhart Griss, Wolfgang Grell, and Manfred Kleemann, Biberach an der Riss, Germany, assignors to Boehringer Ingelheim GmbH, Ingelheim am Rhein, Germany
No Drawing. Filed Apr. 6, 1970, Ser. No. 26,072
Claims priority, application Germany, Apr. 17, 1969, P 19 19 570.1; Jan. 5, 1970, P 20 00 339.8
Int. Cl. C07d 35/30
U.S. Cl. 260—281                          7 Claims

ABSTRACT OF THE DISCLOSURE

2-[p-(N'-cycloalkyl - carbamido - N - sulfonyl) - phenethyl]-1,2,3,4-tetrahydro - 1,3 - dioxo - 4,4 - dimethyl-isoquinolines of the formula

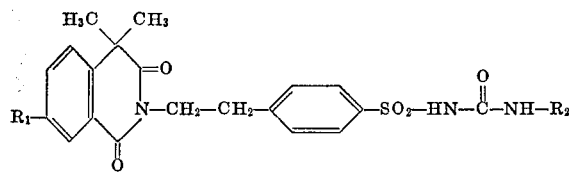

wherein $R_1$ is hydrogen, chlorine, bromine or alkoxy of 1 to 4 carbon atoms, and
$R_2$ is cyclohexyl or adamantyl-(1), and alkali metal salts thereof, useful as hypoglycemics in warm-blooded animals.

This invention relates to novel 2-[p-(N'-cycloalkylcarbamido-N-sulfonyl)-phenethyl] - 1,2,3,4 - tetrahdro - 1,3-dioxo-4,4-dimethyl-isoquinolines and alkali metal salts thereof, and to a method of preparing these compounds.

More particularly, the present invention relates to novel compounds of the formula

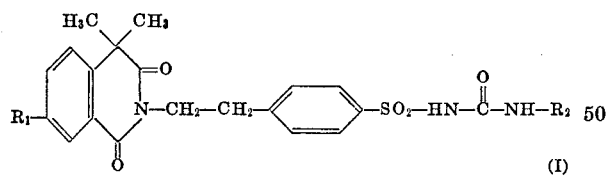

wherein $R_1$ is hydrogen, chlorine, bromine or alkoxy of 1 to 4 carbon atoms, and
$R_2$ is cyclohexyl or adamantyl-(1), and alkali metal salts thereof.

The compounds of the present invention are prepared by reacting a sulfonamide of the formula

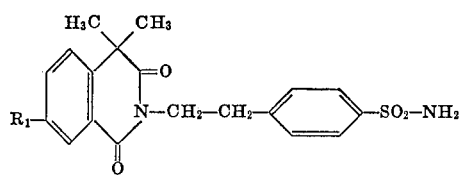

wherein $R_1$ has the same meanings as in Formula I, or an alkali metal salt thereof, with an isocyanate of the formula

$$O=C=N-R_2 \quad (III)$$

wherein $R_2$ has the same meanings as in Formula I.

More specifically, the reaction is preferably carried out by first dissolving a sulfonamide of the Formula II in an inert organic solvent, preferably in a dipolar aprotic solvent such as dimethylformamide, acetone or N-methylpyrrolidone; then converting the dissolved sulfonamide into an alkali metal salt thereof by adding to the solution a strong anhydrous base, for example, an alkali metal hydride, an alkali metal hydroxide or an alkali metal alcoholate, such as potassium tert.-butylate; subsequently, while cooling, adding to the sulfonamide salt solution an isocyanate of the Formula III; allowing the reaction to go to completion at a temperature ranging from relatively low to moderately elevated temperatures, but preferably between —5° C. and room temperature; and isolating the reaction product of the Formula I from the reaction mixture by conventional procedures.

If desired, a compound of the Formula I obtained in this way may be converted into an alkali metal salt thereof by treating a solution of compound I in an inert solvent with an alkali metal ethylate.

The sulfonamide starting compounds of the Formula II are also new; those wherein $R_1$ is hydrogen, chlorine or bromine are prepared by the subjecting a benzenesulfonamide of the formula

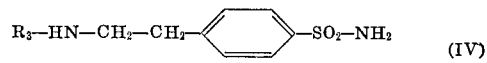

wherein $R_3$ is hydrogen or acetyl, to a condensation reaction with homophthalic acid, with a homophthalic acid derivative comprising activated carboxyl functions, or with a 4-halohomophthalic acid, and then methylating the condensation product with a methyl halide in the presence of a strong base, such as sodium hydroxide or sodium ethylate. The condensation reaction may be carried out by heating a mixture of the reactants to the melting point, or also by heating a solution of the reactants in an inert organic solvent to a temperature between 150 and 200° C.

On the other hand, a sulfonamide of the Formula II, wherein $R_1$ is alkoxy of 1 to 4 carbon atoms, is prepared by subjecting 4-aminosulfonylphenyl-(2)-ethylamine of the formula

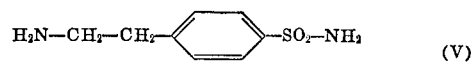

to a condensation-reaction with a 1,2,3,4-tetrahydro-4,4-dimethyl-7-alkoxy-isochromane-dione-(1,3) of the formula

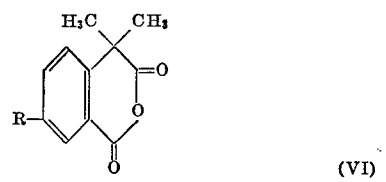

wherein R is alkoxy of 1 to 4 carbon atoms, in the presence of an inert organic solvent, such as xylene, and at the boiling point of the solvent in an apparatus provided with a water separator.

An isochromane derivative of the Formula VI is, in turn, prepared by alkylation of 1,2,3,4-tetrahydro-2,4,4-trimethyl-7-hydroxy-isoquinoline-dione-(1,3 of the formula

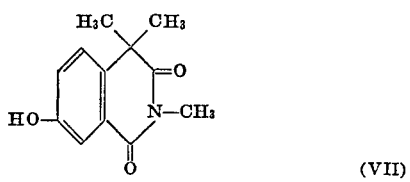

heating the alkylation product with aqueous sodium hydroxide under reflux, and acidifying the reaction solution.

The 1,2,3,4-tetrahydro-2,4,4-trimethyl-7-hydroxyisoquinoline-dione-(1,3) of the Formula VII is itself prepared by nitrating 1,2,3,4-tetrahydro-2,4,4-trimethyl-isoquinoline-dione-(1,3), catalytic reduction of the nitro group, diazotization and hydrolysis of the diazonium compound under reflux.

The isocyanates of the Formula III are described in the literature and may, for example, be prepared from the corresponding amines and phosgene.

The following examples further illustrate the present invention and will enable others skilled in the art to understand it more completely. It should be understood, however, that the invention is not limited solely to the particular examples given below.

EXAMPLE 1

Preparation of 2-[p-(N'-cyclohexyl-carbamido-N-sulfonyl)phenethyl]-1,2,3,4-tetrahydro-4,4-dimethyl-7-methoxyisoquinoline-dione-(1,3)

(a) A mixture consisting of 4 gm. of 1,2,3,4-tetrahydro-4,4-dimethyl-7-methoxy-isochromane-dione-(1,3) (M.P. 95–97° C.), 2.53 gm. of 4-aminosulfonyl-phenyl-(2)-ethylamine and 150 ml. of xylene was heated for two hours at its boiling point in an apparatus provided with a water separator. Thereafter, the reaction mixture was allowed to cool and was then vacuum-filtered, and the filter cake was recrystallized from n-propanol in the presence of activated charcoal. 2.9 gm. (58% of theory) of 1,2,3,4-tetrahydro-4,4-dimethyl-2-[p-aminosulfonylphenyl-(2)-ethyl]-7-methoxy-isoquinolinedione-(1,3), M.P. 203–205° C., of the formula

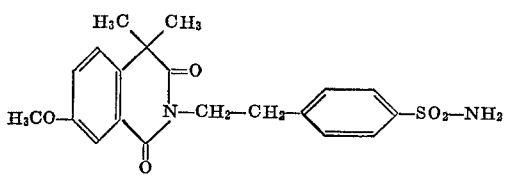

were obtained.

(b) 32.2 gm. of 1,2,3,4-tetrahydro-4,4-dimethyl-2-[p-aminosulfonylphenyl-(2)-ethyl]-7-methoxy-isoquinoline-dione-(1,3) were dissolved in 700 ml. of dimethylformamide, 9.1 gm. of potassium tert.-butylate were added to the solution, and, while cooling the mixture with ice, 14.9 gm. of cyclohexyl isocyanate were added dropwise thereto. Subsequently, the reaction mixture was stirred for 5 hours on an ice bath and was then allowed to stand overnight at −2° C. Thereafter, the reaction solution was admixed with water, the precipitate formed thereby was separated by vacuum-filtration, the filtrate was admixed with more water, and the aqueous solution was acidified with 2 N hydrochloric acid. A greasy substance precipitated out which crystallized after a brief period of contact with boiling methanol. 2.6 gm. (85% of theory) of 1,2,3,4-tetrahydro-2-[p-(N'-cyclohexyl-ureido-N-sulfonyl)-phenethyl]-4,4-dimethyl-7-methoxy-isoquinolinedione-(1,3), M.P. 180–182° C., of the formula

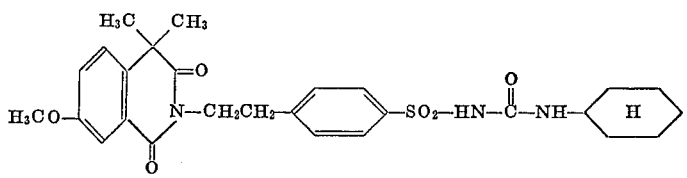

were obtained.

(c) 10.5 gm. of 1,2,3,4-tetrahydro-2-[p-(N'-cyclohexyl-ureido-N-sulfonyl)-phenethyl]-4,4-dimethyl-7-methoxy-isoquinoline-dione-(1,3) were dissolved in 500 ml. of acetone, the solution was cooled to between −5 and 0° C., and a solution of the stiochiometric amount of sodium ethylate in 20 ml. of ethanol was slowly added dropwise. 10.1 gm. (91% of theory) of the sodium salt of 1,2,3,4-tetrahydro-2-[p-(N'-cyclohexyl-ureido-N-sulfonyl)-phenethyl]-4,4-dimethyl-7-methoxy-isoquinoline-dione-(1,3) were obtained as a colorless crystalline substance which sintered beginning at 160° C.

EXAMPLE 2

Using a procedure analogous to that described in Example 1(b), 1,2,3,4-tetrahydro-2-[p-(N'-adamantyl-(1)-ureido-N-sulfonyl)-phenethyl]-4,4-dimethyl-7-methoxy-isoquinoline-dione-(1,3) of the formula

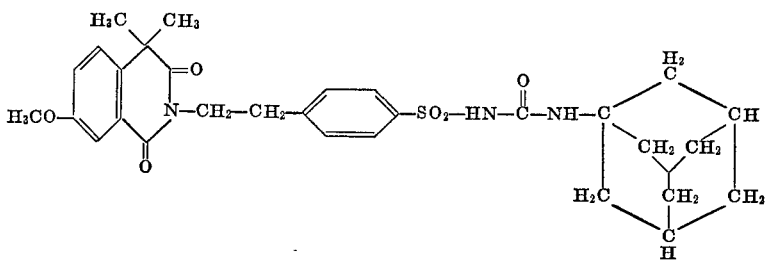

was prepared from 1,2,3,4-tetrahydro-2-[p-(amino-sulfonyl)-phenethyl]-4,4-dimethyl-7-methoxy-isoquinoline-dione-(1,3) and adamantyl-(1)-isocyanate. Its sodium salt had a melting point of 235–238° C.

EXAMPLE 3

Using a procedure analogous to that described in Example 1(b), 1,2,3,4-tetrahydro-2-[p-(N'-cyclohexyl-ureido-N-sulfonyl)-phenethyl]-4,4-dimethyl-7-ethoxy-isoquinoline-dione-(1,3), M.P. 90° C., of the formula

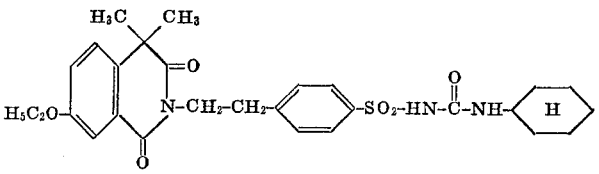

was prepared from 1,2,3,4-tetrahydro-2-[p-(amino-sulfonyl)-phenethyl]-4,4-dimethyl-7-ethoxy-isoquinoline-dione-(1,3), M.P. 149° C., and cyclohexyl-isocyanate. Its sodium salt had a melting point of 175° C.

The 1,2,3,4 - tetrahydro - 2 - [p - (amino-sulfonyl)-phenethyl] - 4,4 - dimethyl - 7 - ethoxy - isoquinoline-dione-(1,3) of the formula

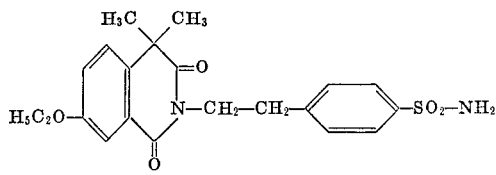

was itself prepared from 1,2,3,4 - tetrahydro - 4,4-dimethyl - 7 - ethoxy - isochromane - dione - (1,3) and p-aminosulfonyl - phenethylamine analogous to Example 1(a).

EXAMPLE 4

Using a procedure analogous to that described in Example 1(b), 1,2,3,4 - tetrahydro - 2 - [p-(N'-adamantyl-(1) - ureido - N - sulfonyl) - phenethyl] - 4,4 - dimethyl-7 - ethoxy - isoquinoline - dione - (1,3), M.P. 107° C., was prepared from 1,2,3,4 - tetrahydro - 2 - [p-(amino-sulfonyl) - phenethyl] - 4,4 - dimethyl - 7 - ethoxy-isoquinoline - dione - (1,3) and adamantyl - (1) - isocyanate. Its sodium salt had a melting point of 225° C.

EXAMPLE 5

Using a procedure analogous to that described in Example 1(b), 1,2,3,4 - tetrahydro - 2 - [p - (N'-cyclohexyl - ureido - N - sulfonyl) - phenethyl]-4,4-dimethyl-7-isopropoxy-isoquinoline-dione-(1,3), M.P. 124° C., of the formula

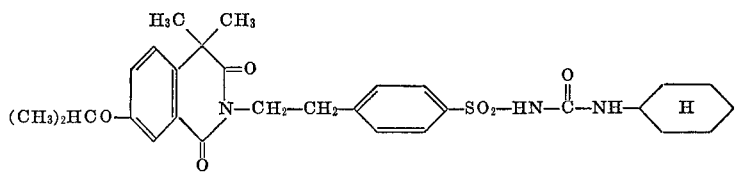

was prepared from 1,2,3,4 - tetrahydro - 2 - [p-(amino-sulfonyl) - phenethyl] - 4,4 - dimethyl - 7 - isopropoxy-isoquinoline - dione - (1,3), M.P. 154° C., and cyclohexyl-isocyanate. Its sodium salt had a melting point of 183° C.

The 1,2,3,4 - tetrahydro - 2 - [p - (amino-sulfonyl)-phenethyl] - 4,4 - dimethyl - 7 - isopropoxy - isoquinoline-dione - (1,3) of the formula

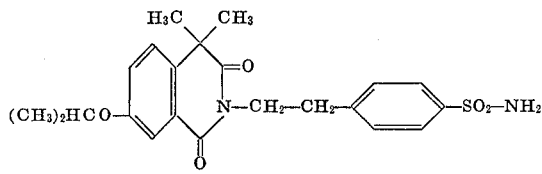

was itself prepared from 1,2,3,4 - tetrahydro - 4,4 - dimethyl - 7 - isopropoxy - isochromane - dione-(1,3) and p-(amino-sulfonyl)-phenethylamine analogous to Example 1(a).

EXAMPLE 6

Using a procedure analogous to that described in Example 1(b), 1,2,3,4 - tetrahydro - 2 - [p-(N'-cyclohexyl-ureido - N - sulfonyl) - phenethyl] - 4,4 - dimethyl-7-n-butoxy-isoquinoline - dione - (1,3), M.P. 95° C., of the formula

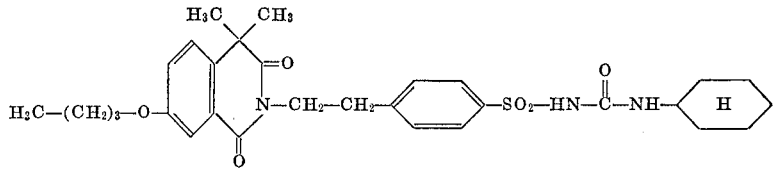

was prepared from 1,2,3,4 - tetrahydro - 2 - [p-(amino-sulfonyl) - phenethyl] - 4,4 - dimethyl - 7 - n - butoxy-isoquinoline - dione - (1,3), M.P. 107° C., cyclohexyl-isocyanate. Its sodium salt had a melting point of 225° C.

The 1,2,3,4 - tetrahydro - 2 - [p - (amino-sulfonyl)-phenylethyl] - 4,4 - dimethyl - 7 - n - butoxy-isoquinoline-dione-(1,3) of the formula

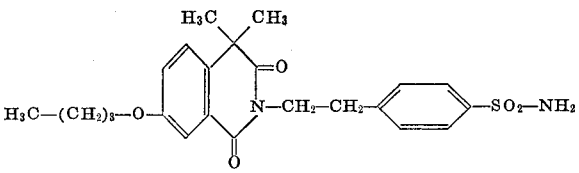

was itself prepared from 1,2,3,4 - tetrahydro - 4,4 - dimethyl - 7 - n - butoxy - isochromane - dione - (1,3) and p - (amino - sulfonyl) - phenethylamine analogous to Example 1(a).

EXAMPLE 7

Preparation of 1,2,3,4 - tetrahydro - 2 - [p - (N'-cyclohexyl - ureido - N - sulfonyl)-phenethyl]-4,4-dimethyl-isoquinoline-dione-(1,3)

(a) A mixture consisting of 26.7 gm. of 1,2,3,4-tetrahydro - 2 - [p - (amino - sulfonyl) - phenethyl] - isoquinoline - dione - (1,3), M.P. 246° C., 170 ml. of ethanol, 30 ml. of water and 22 gm. of methyl iodide was heated to its boiling point and simultaneously a solution of 155 millimols of sodium ethylate in 70 ml. of ethanol was added dropwise thereto. After all of the sodium ethylate solution had been added, the reaction mixture was boiled for 2 to 4 hours more. Thereafter, the solvent medium was distilled off, the residue was admixed with ice water, and the insoluble raw product was collected and recrystallized from chlorobenzene. 22.7 gm. (78.5% of theory) of 1,2,3,4 - tetrahydro - 4,4 - dimethyl - 2 - [p-(amino - sulfonyl) - phenethyl] - isoquinoline - dione-(1,3), M.P. 213–214° C., of the formula

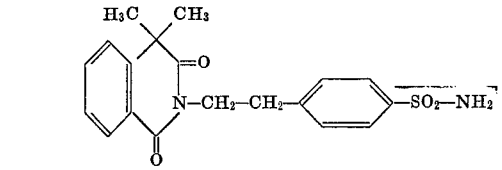

were obtained.

(b) 5 gm. of 1,2,3,4-tetrahydro-4,4-dimethyl-2-[p-(amino-sulfonyl)-phenethyl]-isoquinoline-dione - (1,3) were dissolved in 28 ml. of dimethylformamide and converted into the sodium salt with a 50% oil suspension of 0.64 gm. of sodium hydride. After everything had gone into solution, 1.83 gm. of cyclohexyl-isocyanate were added at 5° C., and the mixture was stirred for 1 to 2 hours at room temperature to allow the reaction to go to completion. Thereafter, the reaction mixture was admixed with 100 ml. of water, and the resulting aqueous solution was acidified with glacial acetic acid. The precipitate formed thereby was collected and recrystallized from methanol, yielding 2.6 gm. (39.1% of theory) of 1,2,3,4-tetrahydro-2-[p-(N'-cyclohexyl-ureido-N-sulfonyl) - phenethyl] - 4,4 - dimethyl-isoquinoline-dione-(1,3), M.P. 179–181° C., of the formula

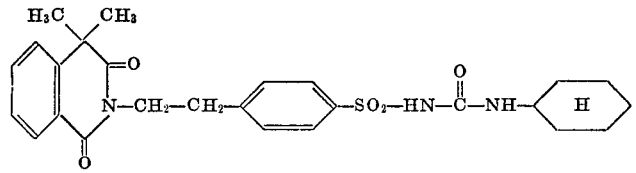

Its sodium salt began to decompose at 205° C.

EXAMPLE 8

Using a procedure analogous to that described in Example 7(b), 1,2,3,4 - tetrahydro - 2 - [p-(N'-adamantyl-(1)-ureido-N-sulfonyl)-phenethyl] - 4,4 - dimethyl - 7 - bromo-isoquinoline-dione - (1,3), M.P. 119° C. (from methanol), of the formula

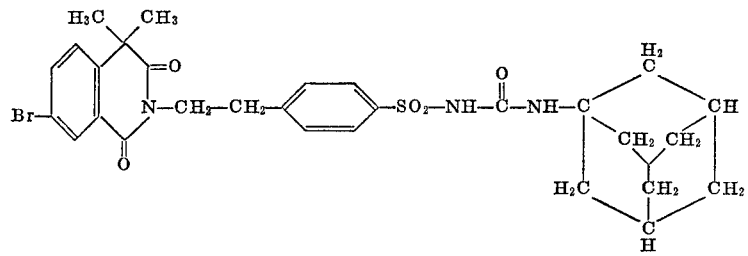

was prepared from 1,2,3,4-tetrahydro-2-[p-(amino-sulfonyl)-phenethyl]-4,4 - dimethyl - 7 - bromo-isoquinoline-dione-(1,3), M.P. 186° C., and adamantyl-(1)-isocyanate. The yield was 14.4% of theory. Its sodium salt had a melting point of 226° C. (decomp.).

The 1,2,3,4-tetrahydro - 2 - [p-(amino-sulfonyl)-phenethyl] - 4,4-dimethyl-7-bromo-isoquinoline-dione-(1,3) of the formula

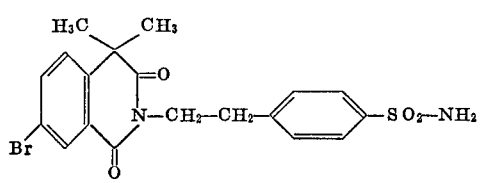

was itself prepared from 1,2,3,4-tetrahydro-2-[p-(amino-sulfonyl)-phenethyl]-isoquinoline-dione-(1,3), M.P. 238° C., and methyl iodide analogous to Example 7(a).

EXAMPLE 9

Using a procedure analogous to that described in Example 7(b), 1,2,3,4 - tetrahydro - 2 - [p-(N'-cyclohexyl-ureido-N-sulfonyl)-phenethyl]-4,4-dimethyl - 7-chloro-isoquinolinedione-(1,3), M.P. 177° C. (from methanol), of the formula

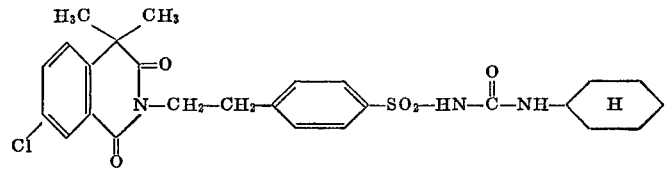

was prepared from 1,2,3,4-tetrahydro-2-[p-(amino-sulfonyl)-phenethyl]-4,4-dimethyl - 7 - chloro-isoquinoline-dione-(1,3), M.P. 193° C., and cyclohexyl-isocyanate. The yield was 40% of theory.

The 1,2,3,4-tetrahydro - 2 - [p-amino-sulfonyl)-phenethyl]-4,4-dimethyl-7-chloro-isoquinoline-dione - (1,3), of the formula

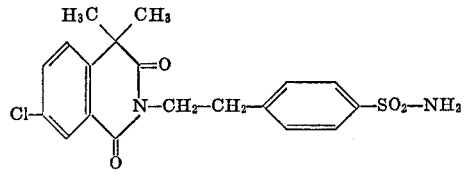

was itself prepared from 1,2,3,4-tetrahydro-2-[p-(amino-sulfonyl) - phenethyl] - isoquinoline-dione - (1,3), M.P. 252° C., and methyl iodide analogous to Example 7(a).

EXAMPLE 10

Using a procedure analogous to that described in Example 7(b), 1,2,3,4-tetrahydro-2-[p-(N'-adamantyl)-(1)-ureido-N-sulfonyl)-phenethyl] - 4,4 - dimethyl-isoquinoline-dione-(1,3), M.P. 199° C. (from methanol), was prepared from 1,2,3,4-tetrahydro - 2 - [p-(amino-sulfonyl)-phenethyl] - 4,4 - dimethyl-isoquinoline-dione-(1,3) and adamantyl-(1)-isocyanate. The yield was 10.4% of theory. Its sodium salt had a melting point of 232–235° C. (decomp.).

EXAMPLE 11

Using a procedure analogous to that described in Example 7(b), 1,2,3,4-tetrahydro-2-[p-(N'-adamantyl-(1)-ureido-N-sulfonyl)-phenethyl] - 4,4 - dimethyl - 7 - chloro-isoquinoline-dione-(1,3), M.P. 184° C. (from ethanol), was prepared from 1,2,3,4-tetrahydro-2-[p-(amino-sulfonyl)-phenethyl]-4,4 - dimethyl - 7 - chloro-isoquinoline-dione-(1,3) and adamantyl-(1)-isocyanate. The yield was 10% of theory.

EXAMPLE 12

Using a procedure analogous to that described in Example 7(b), 1,2,3,4-tetrahydro-2-[p-(N'-cyclohexyl-ureido-N-sulfonyl)-phenethyl] - 4,4 - dimethyl - 7 - bromo-isoquinoline-dione-(1,3), M.P. 179° C. (from ethanol), was prepared from 1,2,3,4-tetrahydro-2-[p-(aminosulfonyl)-phenethyl] - 4,4 - dimethyl - 7 - bromo-isoquinoline-dione-(1,3) and cyclohexyl-isocyanate. The yield was 50% of theory.

The compounds according to the present invention, that is, the free acids embraced by Formula I above and their alkali metal salts, have useful pharmacodynamic properties. More particularly, they exhibit very effective hypoglycemic activities at low dosage levels and low toxicity in warm-blooded animals, as evidenced by the following pharmacological test results.

The following compounds of the instant invention were tested for hypoglycemic activity and acute toxicity:

(A) 1,2,3,4-tetrahydro-2-[p-(N'-cyclohexyl-ureido-N-sulfonyl)-phenethyl]-4,4-dimethyl-isoquinoline-dione-(1,3);

(B) 1,2,3,4-tetrahydro-2-[p-(N'-cyclohexyl-ureido-N-sulfonyl)-phenethyl]-4,4-dimethyl-7-chloro-isoquinoline-dione-(1,3);

(C) 1,2,3,4-tetrahydro-2-[p-(N'-cyclohexyl-ureido-N-sulfonyl)-phenethyl]-4,4-dimethyl-7-methoxyisoquinoline-dione-(1,3);

(D) 1,2,3,4-tetrahydro-2-[p-(N'-adamantyl-(1)-ureido-N-sulfonyl)-phenethyl]4,4-dimethyl-isoquinoline-dione-(1,3);

(E) 1,2,3,4-tetrahydro-2-[p-(N'-adamantyl-(1)-ureido-N-sulfonyl)-phenethyl]-4,4-dimethyl-7-chloro-isoquinoline-dione-(1,3);

(F) 1,2,3,4-tetrahydro-2-[p-(N'-adamantyl-(1)-ureido-N-sulfonyl)-phenethyl]-4,4-dimethyl-7-bromo-isoquinoline-dione-(1,3); and (G) 1,2,3,4-tetrahydro-2-(p-(N'-cyclohexyl-ureido-N-sulfonyl)-phenethyl]4,4-dimethyl-7-methoxyisoquinoline-dione-(1,3).

(1) Hypoglycemic activity: The minimum effective hypoglycemic peroral dose of the compounds and the hypoglycemic effect produced thereby over the normal blood sugar content (in mgm. percent) were determined on adult male laboratory rats having an average body weight of 180 gm.; the test animals received a normal diet. Each compound under investigation, in the form of its sodium salt, was suspended in aqueous methyl cellulose, the suspension was administered to the test animals perorally by means of an esophageal sound, and a blood sample of 20 microliters was taken from the tail at hourly intervals. Each compound was tested at varying dosage levels on a statistically significant number of animals.

The glucose content of each blood sample was determined by means of an automatic Technicon-Auto Analyzer [see U. Harding and G. Heinzel, Zeitshrift for Klinische Chemie und Klinische Biochemie 7, No. 6 (1969)] according to the hexokinase method, i.e. phosphorylation of the glucose with ATP (adenosine triphosphate) into glucose-6-phosphate, followed by reduction with glucose-6-phosphate dehydrogenase into gluconate-6-phosphate, and photometrically measuring at 334 nm. the amount of $NADPH_2$ simultaneously formed from NADP (nicotinamide-adenine dinucleotide phosphate). The following table shows the results obtained.

TABLE I

| Compound | Minimum effective hypoglycemic dose, mgm./kg., p.o. | Reduction of blood sugar content over normal, mgm. percent |
|---|---|---|
| A | 0.62 | 14 |
| B | 0.66 | 12 |
| C | 0.31 | 8 |
| D | 0.31 | 9 |
| E | 0.62 | 20 |
| F | 0.31 | 11 |
| G | 0.20 | 10 |

The sodium salts of compounds A–G produced no significant changes in the blood pressure at dosages of 8 and 16 mgm./kg. i.v. in anesthetized rats.

(2) Acute toxicity: (a) The acute intravenous toxicity of the sodium salts of compounds A, D, E, F and G was determined in adult white laboratory mice (body weight 18–25 gm.). Each of the compounds under investigation was tested at no less than four dosage levels on 10 animals per dose. For this purpose, the calculated amount of each of the sodium salts was dissolved in 0.01 N sodium hydroxide, and then 0.2 ml./10 gm. body weight of the solution was injected into the tail vein of the animal within 30 seconds. The animals were observed for seven days, and the number of animals which died during that period was recorded. From this raw data, the median intravenous lethal dose ($LD_{50}$ i.v.), i.e. the dose which causes death in 50% of the animals within 7 days, was calculated by the standard statistical method according to Behrens-Kärber.

(b) The median peroral lethal dose ($LD_{50}$ p.o.) was determined and calculated in analogous manner for the sodium salts of compounds A–G and for the free acid form of compounds A, C, D, F and G. For this purpose, each of the respective compounds was first milled to a particle size of 10μ, the milled substance was homogeneously suspended in aqueous 1% methyl cellulose, and 2 ml./25 gm. body weight of the suspension comprising the dose to be tested were administered by means of an esophageal sound. The following table shows the results obtained:

TABLE II

| | Acute toxicity of the— | | |
|---|---|---|---|
| | Sodium salts | | Free acids, |
| Compound | $LD_{50}$ p.o., gm./kg. | $LD_{50}$ i.v., mgm./kg. | $LD_{50}$ p.o., gm./kg. |
| A | >2.0 | 234 | >15 |
| B | ~2.0 | | |
| C | >2.0 | | >15 |
| D | >2.5 | 260 | >15 |
| E | >2.5 | 210 | |
| F | >2.5 | 191 | >15 |
| G | 1.5 | 300 | >15 |

For pharmaceutical purposes the compounds according to the present invention are administered to warm-blooded animals, preferably perorally, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspension, emulsions, syrups and the like. One effective dosage unit of the compounds according to the present invention is from 0.0166 to 0.167 mgm./kg. body weight, preferably 0.0416 to 0.084 mgm./kg. body weight.

The following examples illustrate a few dosage unit compositions comprising a compound of the instant invention as an active ingredient and represent the best mode contemplated of putting the invention to practical use. The parts are parts by weight unless otherwise specified.

EXAMPLE 13

Tablets

The tablet composition was compounded from the following ingredients:

| | Parts |
|---|---|
| 1,2,3,4-tetrahydro - 2 - [p-(N'-cyclohexyl-ureido-N-sulfonyl) - phenethyl]-4,4-dimethyl-7-methoxy-isoquinoline-dione-(1,3) | 2.5 |
| Lactose | 87.5 |
| Corn starch | 26.0 |
| Polyvinylpyrrolidone | 3.0 |
| Magnesium stearate | 1.0 |
| Total | 120.0 |

Compounding procedure: The tetrahydro-isoquinoline-dione compound was intimately admixed with the lactose and the corn starch, the mixture was uniformly moistened with an ethanolic 12.5% solution of the polyvinylpyrrolidone, the moist mass was forced through a 1.5 mm.-mesh screen, the resulting granulate was dried at 45° C. and again passed through a 1.0 mm.-mesh screen, the dry granulate was admixed with the magnesium stearate, and the composition was compressed into 120 mgm.-tablets. Each tablet contained 2.5 mgm. of the tetrahydro-isoquinoline-dione compound and, when administered perorally to a warm-blooded animal of about 60 kg. body weight in need of such treatment, produced very good hypoglycemic effects.

EXAMPLE 14

Gelatin capsules

The capsule filler composition was compounded from the following ingredients:

| | Parts |
|---|---|
| 1,2,3,4-tetrahydro - 2 - [p-(N'-cyclohexyl-ureido-N - sulfonyl) - phenethyl] - 4,4 - dimethyl-7-methoxy-isoquinoline-dione-(1,3) | 2.5 |
| Corn starch, dry | 97.5 |
| Total | 100.0 |

Compounding procedure: The ingredients were intimately admixed with each other, the mixture was passed through a 0.75 mm.-mesh screen, and 100 mgm.-portions of the screened composition were filled into individual hard gelatin capsules of suitable size. Each capsule contained 2.5 mgm. of the tetrahydro-isoquinoline-dione compound, and, when administered perorally to a warm-blooded animal of about 60 kg. body weight in need of such treatment, produced very good hypoglycemic effects.

Analogous results were obtained when an equal amount of any other compound of the present invention was substituted for the particular tetrahydro-isoquinoline-dione compound in illustrative Examples 13 and 14. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that the invention is not limited to these embodiments and that various changes and modifications may be made without departing from the spirit of the invention or the scope of the appended claims.

We claim:

1. A compound of the formula

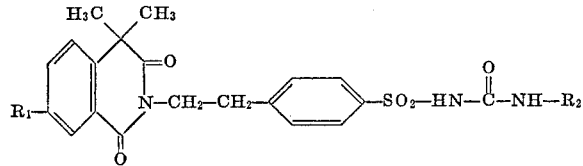

wherein
$R_1$ is hydrogen, chlorine, bromine, or alkoxy of 1 to 4 carbon atoms, and
$R_2$ is cyclohexyl or adamantyl-(1),
or an alkali metal salt thereof.

2. A compound of the formula

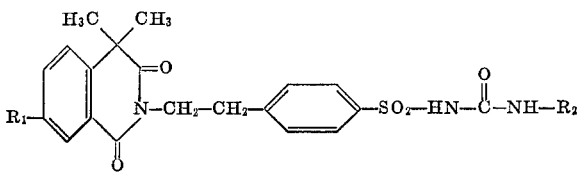

wherein
$R_1$ is hydrogen, chlorine, bromine or alkoxy of 1 to 4 carbon atoms, and
$R_2$ is cyclohexyl or adamantyl-(1),
or the sodium salt thereof.

3. A compound according to claim 2, which is 1,2,3,4-tetrahydro-2-[p-(N'-cyclohexyl-ureido - N - sulfonyl)-phenethyl]-4,4-dimethyl - 7 - bromo-isoquinoline-dione-(1,3) or the sodium salt thereof.

4. A compound according to claim 2, which is 1,2,3,4-tetrahydro - 2 - [p-(N'-adamantyl - (1) - ureido-N-sulfonyl)-phenethyl] - 4,4 - dimethyl-isoquinoline-dione-(1,3) or the sodium salt thereof.

5. A compound according to claim 2, which is 1,2,3,4-tetrahydro-2-[p-(N'-adamantyl - (1) - ureido - N - sulfonyl)-phenethyl]-4,4-dimethyl - 7 - bromo-isoquinoline-dione-(1,3) or the sodium salt thereof.

6. A compound according to claim 2, which is 1,2,3,4-tetrahydro - 2 - [p-(N'-cyclohexyl-ureido-N-sulfonyl)-phenethyl]-4,4-dimethyl - 7 - methoxy-isoquinoline-dione-(1,3) or the sodium salt thereof.

7. A compound according to claim 2, which is 1,2,3,4-tetrahydro - 2 - [p-(N'-adamantyl-(1)-ureido - N - sulfonyl)-phenethyl]-4,4-dimethyl - 7 - chloro-isoquinoline-dione-(1,3) or the sodium salt thereof.

References Cited

UNITED STATES PATENTS

| 2,842,450 | 2/1959 | Sasse | 260—281 |
| 3,449,346 | 6/1969 | Aumüllen | 260—281 |

DONALD G. DAUS, Primary Examiner

U.S. Cl. X.R.

260—453; 424—258